United States Patent [19]

Biederstedt et al.

[11] Patent Number: 4,887,183

[45] Date of Patent: Dec. 12, 1989

[54] COMMUNICATION SYSTEM THERMOPROTECTION DEVICE FOR OVER VOLTAGE SUPPRESSOR MOUNTED IN OVERVOLTAGE SUPPRESSOR MAGAZINES OF COMMUNICATION SYSTEMS

[75] Inventors: Lutz Biederstedt; Manfred Muller, both of Berlin, Fed. Rep. of Germany

[73] Assignee: Krone AG, Berlin, Fed. Rep. of Germany

[21] Appl. No.: 257,388

[22] Filed: Oct. 13, 1988

[30] Foreign Application Priority Data

Oct. 20, 1987 [DE] Fed. Rep. of Germany ....... 3735837

Jun. 10, 1988 [DE] Fed. Rep. of Germany ..... 38202727

[51] Int. Cl.[4] .......... H02H 9/04

[52] U.S. Cl. .......... 361/124; 361/118; 337/32; 337/34

[58] Field of Search .......... 337/28, 31, 32, 33, 337/34; 361/118, 119, 120, 124, 125

[56] References Cited

U.S. PATENT DOCUMENTS

| | | | |
|---|---|---|---|
| 4,034,326 | 7/1977 | Hill et al. | 361/124 |
| 4,056,840 | 11/1977 | Lundsgaard et al. | 361/124 |
| 4,233,641 | 11/1980 | Baumbach | 361/124 |
| 4,305,109 | 12/1981 | Schilling et al. | 361/119 |
| 4,449,156 | *5/1984 | Singer, Jr. | 361/119 |
| 4,717,902 | 1/1988 | James | 337/32 |

FOREIGN PATENT DOCUMENTS

| | | | |
|---|---|---|---|
| 2911110 | 9/1980 | Fed. Rep. of Germany | 361/124 |
| 3410610 | 9/1985 | Fed. Rep. of Germany | 361/119 |

*Primary Examiner*—A. D. Pellinen
*Assistant Examiner*—H. L. Williams
*Attorney, Agent, or Firm*—McGlew & Tuttle

[57] ABSTRACT

A thermal protection device for overvoltage suppressor which includes spaced contacts 6 mounted in overvoltage suppressor magazines 11 of communication systems. A bow-type spring 3 and a melt element 2 are arranged with the overvoltage suppressor which is mounted in a chamber of a case body or housing 13. The melt element is pierced by at least one arm of the bow-type spring when an overvoltage occurs for short-circuiting the two contacts of the overvoltage suppressor. A thermal protection device with simple components prevents creepage currents between the bow-type spring and the contacts of the overvoltage suppressor 6, a chamber for the overvoltage suppressor is adjacent and abutting to a separate chamber formed in the case body for accommodating a bow-type spring. Between the two chambers there is a separating wall comprising a thermoplastic melt element.

7 Claims, 1 Drawing Sheet

COMMUNICATION SYSTEM THERMOPROTECTION DEVICE FOR OVER VOLTAGE SUPPRESSOR MOUNTED IN OVERVOLTAGE SUPPRESSOR MAGAZINES OF COMMUNICATION SYSTEMS

BACKGROUND OF THE INVENTION

Field of the Invention

This invention relates in general to communication devices and in particular to an overvoltage suppressor construction and to a thermoprotection devcie therefore.

A similar thermal protection device is known from DE No. 27 38 078 A1. Therein, a melt element is formed as a sleeve surrounding the overvoltage suppressor, the sleeve being pierced by the arms of a U-shaped bow-type spring in case of an overvoltage. It is disadvantageous, that the melt element is an additional component, needing, further, to be adapted accurately to the shape of the overvoltage suppressor. Moreover, creepage currents between the arms of the bow-type spring and the contacts of the overvoltage suppressor may occur.

Further, a thermal protection device of a different type is known from EP No. 0.040.522 A1, wherein the overvoltage suppressor is not mounted in a chamber of the case body. Instead, pan-type melt elements are disposed, for accommodating compression springs of an overvoltage, the bottom sections of the pan-type melt elements will melt, and also the springs connecting the yoke-type contact plates to each other. In case of an overvoltage, the bottom sections of the pan-type elements will melt, and the springs connect the yoke-type contact plates to each other. It is disadvantageous, that the pan-type melt elements are additional components.

Further, from the bulletin "Surge Arresters" of the M-O Valve Company Ltd., a thermal protection device of overvoltage suppressor is known. This device is provided with a fixed spring rod held spaced from the overvoltage suppressor by means of a plastic coating. In case of an overvoltage, the plastic coating will melt, whereby the spring rod will short-circuit over the contacts of the overvoltage suppressor. It is disadvantageous that the spring rod is a special component fixed to the overvoltage suppressor, and the overvoltage suppressor cannot be reused after the plastic coating becomes molen.

SUMMARY OF THE INVENTION

The invention provides a thermal protection device needing only few and simple components and which prevents creepage currents between a bow-type spring and the contacts of the overvoltage suppressor.

According to the invention, the melt element is formed by a separating wall of thermoplastic arranged between two chambers for accommodating the overvoltage suppressor and the bow-type spring. The separating wall is of a simple construction and is an easily replaceable component. By the arrangement of the bow-type spring in the separate chamber, there is, further, a sufficient electrical separation between the bow-type spring and the contacts of the overvoltage suppressor, such that no creepage currents can be formed. Moreover, the overvoltage suppressor can still be used after the occurrence of an overvoltage.

Further advantageous embodiments of the invention result from a one-part design of the separating wall with the base body. There is a possibility to insert the overvoltage suppressor independently from the bow-type spring into the overvoltage suppressor magazine, or to remove it. Hereby, the time required for mounting the overvoltage suppressor magazines is reduced considerably.

Accordingly it is an object of the invention to provide an overvoltage suppressor which includes an enclosing wall having spaced apart contacts therein one of which engages ground and the other of which engages a contact connector and a separate housing containing a substantially U-shaped spring having respective legs in alignment with respective contacts and pairing of one leg with a ground member and wherein the closing wall is made up of an alterable material which when it melts, for example due to overload, a shorting out of the contacts will result by permitting the spring elements to engage the contacts on melting of the enclosing walls.

A further object of the invention is to provide a thermo protection device for an overvoltage suppressor which includes a grounded spring which has a pair of spaced apart leg portions which engage the shortout contacts and shortcircuit with the suppressor when an enclosing wall for this suppressor contact is melted.

A further object of the invention is to provide a method for protecting a suppressor which comprises arranging a conductive resilient member so that portions thereof are aligned with contacts of the suppressor and separating the portions from the suppressor by a wall which is meltable and which will melt during overload to permit shorting out of the contacts.

A further object of the invention is to provide a suppressor and a thermoprotection device therefore which are simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

DESCRIPTION OF THE PREFERRED EMBODIMENT

Figure 1:
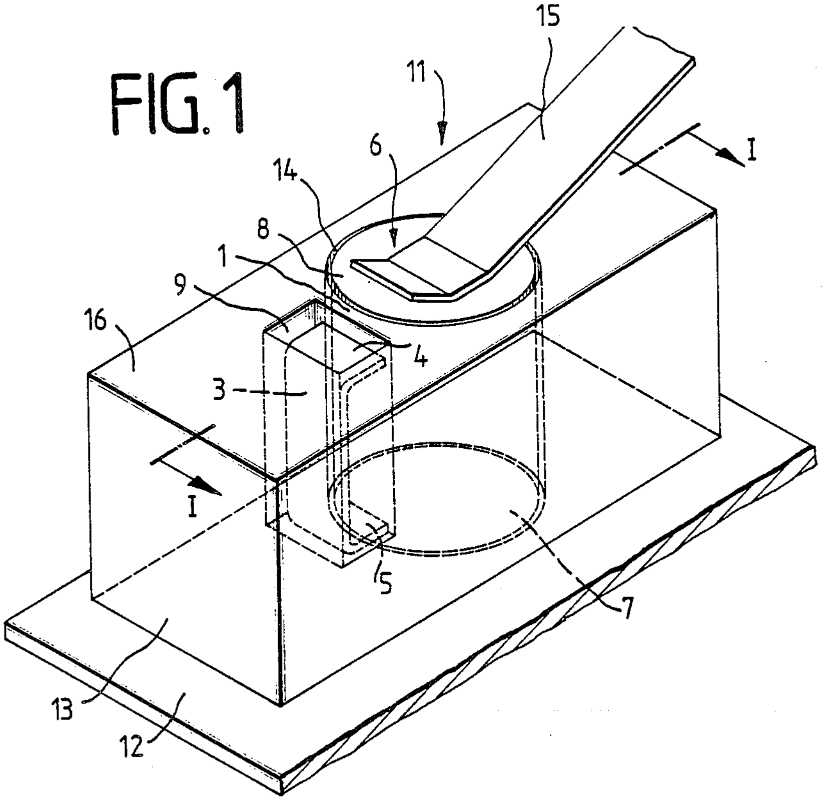
FIG. 1 is a perspective representation of an overvoltage suppressor magazine with a thermal protection device constructed in accordance with the invention.

Referring to the drawings in particular the invention embodied therein comprises an apparatus and method for the thermal protection of a voltage suppressor particularly of a communication system with spaced apart contacts 7 and 8 which are maintained in a housing which defines an enclosing wall or separating wall 1. The apparatus also includes a chamber forming member defining a chamber 9. A contact member 3, which is advantageously a spring having leg portions 4 and 5, is aligned with respective contacts 7 and 8. The contacts 7 and 8 are held between a contact spring 15 and a base or ground rail 12. In accordance with the invention the wall 1 is made of material which melts due to thermal overload and permits the leg portions 4 and 5 to come into engagement with the contacts 7 and 8 and shortout a suppressor.

Figure 2:
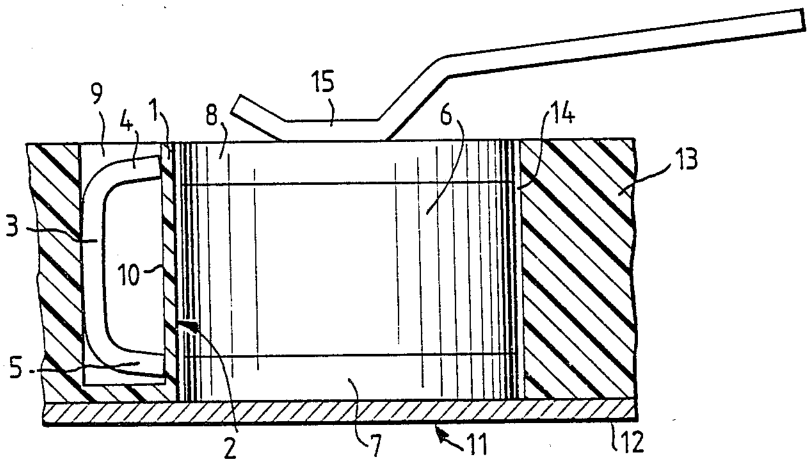
FIG. 2 is a section taken along the line I—I of FIG. 1.

The overvoltage suppressor magazine 11 includes a rectangular case body 13 of thermoplastic and a metal ground rail 12. In the case body 13, one or several chambers 14, which open at the top, are provided for accommodation of overvoltage suppressor 6. Such suppressors 6 are preferably side-by-side in a line. A chamber 9 is assigned to cooperate with each of the chambers 14 for accommodation of U-shaped or of bow-type springs 3. As shown in FIGS. 1 and 2, the inner shape of the chamber 14 is adapted to the shape of the cylindrical overvoltage suppressor 6, the suppressor 6 has spaced apart contacts 7 and 8 adjacent each end face.

The cylindrical chamber 14 is closed on the bottom side by the ground rail 12 extending over the entire bottom surface of the case body 13. This arrangement provides that the contact 7, of the overvoltage suppressor 6 mounted in the chamber 14, is connected electrically with the ground rail 12. At the top side 16 of the case body 13, a contact spring 15, connected to a communication cable, has an inner end which rests against the other contact 8 of the overvoltage suppressor 6. The contact spring 15 presses the overvoltage suppressor 6 with a spring-type action against the ground rail 12, the overvoltage suppressor 6 being, thus, held in a clamping manner in the chamber 14. Adjacent to each chamber 14 there is provided the other rectangular chamber 9 which is open at its top. This chamber, in contrast to chamber 14, is closed at the bottom and has no connection to the ground rail 12. The chambers 9 and 14 are separated from each other by a thin separating wall 1 of thermoplastic of the case body 13.

Into the chamber 9 open at its tip, a U-shaped spring 3 with two arms 4 and 5 is inserted. The U-shaped spring is disposed such that the arms 4 and 5 extend toward the direction of the separating wall 1. The ends of the spring arms 4, 5 are assigned to the contacts 7, 8 of the overvoltage suppressor 6. The spring arms 4, 5 and are separated from the contacts 7, 8 by the separating wall 1 only. The bow-type spring 3 is slightly prestressed, such that both arms 4 and 5 of the bow-type spring 3 are pressed rectangularly against the separating wall 1.

When an overvoltage occurs, the overcurrent flows over the contact spring 15 to the contact 8 of the overvoltage suppressor 6. Between the one contact 8 and the other contact 7 of the overvoltage suppressor there is a gas-discharge path, such that an arc will be formed between the contacts 7, 8 of the overvoltage suppressor 6, As the contact 7 rests directly against the ground rail 12, the overcurrent being formed is conducted to earth.

In the case that the overcurrent flows for a longer period of time, the overvoltage suppressor magazine 11 would be destroyed because of the high temperature. In order to prevent this destruction, the other chamber 9 with the U-shaped spring 3 is provided adjacent the each chamber 14 accommodating an overvoltage suppressor 6. By the heating of the overvoltage suppressor 6 at high temperatures, the separating wall 1 limiting the two chambers 9, 14 becomes plastic, such that the arms 4, 5 of the bow-type spring 3 pressing under spring acting against the separating wall 1 will pierce the wall.

An electrical connection between the bow-type spring 3 and the overvoltage suppressor 6, is thus, created, because the spring arm 4 impinges upon the contact 8, and the spring arm 5 impinges upon the contact 7 of the voltage suppressor 6. The arc generated in the gas-discharge path of the overvoltage suppressor 6 is, thus, short-circuited by the bow-type spring 3, whereby the overcurrent can flow off directly to earth potential. The separating wall 1 has a minimum thickness of approximately 0.3 mm.

In an embodiment (not shown) the separating wall is formed as separate part, placed between the two chambers 9 and 14.

While specific embodiments of the invention have been shown and described in detail to illustrate the application of the principles of the invention, it will be understood that the invention may be embodied otherwise without departing from such principles.

We claim:

1. An overvoltage suppressor, comprising a metal ground plate, an overvoltage suppressor housing defining a suppressor chamber with a suppressor, contacts located at the top of and the bottom of said suppressor, one of said contacts being in engagement with said ground plate and another of said contacts being positioned spaced from said one of said contacts, means defining a spring chamber, thermoplastic wall means separating said spring chamber from said suppressor chamber, a U-shaped positioned spring in said spring chamber having a first leg aligned with said one contact and having an opposite second leg aligned with said another contact and having an intermediate bow-type spring portion, and thermoplastic wall means being formed of a material which will melt so that said bow-type spring portion will urge said spring legs to penetrate through said thermoplastic wall means and cause contact between said legs and corresponding said contacts providing electrical connection between said contacts.

2. A thermal protection device according to claim 1, wherein said thermoplastic wall means has a wall thickness of approximately 0.3 mm.

3. A thermal protection device according to claim 1, wherein said thermoplastic wall means is formed as an integral part of said case body, said enclosing wall forming a magazine holding said contacts.

4. A method of protecting an over voltage suppressor from thermal overload comprising the steps of: arranging the suppressor contacts in an enclosing wall so that they are spaced apart and one is engaged by a ground element and the other is engaged by a contact spring; positioning a conductive bow-type spring member alongside the contacts of the suppressor; separating the conductive spring member from the contacts of the suppressor by a meltable wall; the conductive spring member with the suppressor contact so that when the wall melts the conductive spring member will move into engagement with the respective suppressor contacts to provide an electrical connection between the suppressor contacts.

5. A thermal protection device for an overvoltage suppressor of an overvoltage suppressor magazine for communication systems, comprising: means defining a suppressor chamber; a first overvoltage suppressor contact element positioned within said suppressor chamber; a second overvoltage suppressor contact element positioned within said suppressor chamber; a ground plate member connected to said first suppressor contact member, said second suppressor contact member adapted to electrically engage an electrical contact; means defining an additional chamber positioned adjacent said suppressor chamber including thermoplastic wall means dividing said suppressor chamber and said additional chamber, said thermoplastic wall means melting and becoming plastic upon being heated; a bow-type contact spring element having a first contact leg and a second contact leg, said bow-type spring element being positioned in said additional chamber with said first contact leg aligned with said first suppressor contact element and said second contact leg aligned with said second suppressor contact element, each of said first and second contact legs being biased into engagement with said thermoplastic wall means by said bow-type spring and penetrating said thermoplastic wall means upon said thermoplastic wall means melting.

6. An overvoltage suppressor, according to claim 5, wherein said thermoplastic wall means has a wall thickness of approximately 0.3 mm.

7. An overvoltage suppressor according to claim 5, wherein said thermoplastic wall means is formed integral with each of said means defining a suppressor chamber and means defining an additinal chamber.

* * * * *